US012555996B2

(12) United States Patent
Marketos et al.

(10) Patent No.: US 12,555,996 B2
(45) Date of Patent: Feb. 17, 2026

(54) CONFIGURABLE POWER DISTRIBUTION SYSTEM FOR REMOTE RADIO UNITS

(71) Applicant: John Mezzalingua Associates, LLC, Liverpool, NY (US)

(72) Inventors: Leon Marketos, Weedsport, NY (US); Sri Guntupalli, Newark, DE (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 219 days.

(21) Appl. No.: 18/578,490

(22) PCT Filed: Jul. 15, 2022

(86) PCT No.: PCT/US2022/037308
§ 371 (c)(1),
(2) Date: Jan. 11, 2024

(87) PCT Pub. No.: WO2023/288072
PCT Pub. Date: Jan. 19, 2023

(65) Prior Publication Data
US 2024/0388083 A1 Nov. 21, 2024

Related U.S. Application Data

(60) Provisional application No. 63/222,162, filed on Jul. 15, 2021.

(51) Int. Cl.
*H02J 1/08* (2006.01)
*H02B 1/056* (2006.01)
(Continued)

(52) U.S. Cl.
CPC .............. *H02J 1/086* (2020.01); *H02B 1/056* (2013.01); *H02B 1/18* (2013.01); *H02J 1/001* (2020.01); *H04W 88/085* (2013.01)

(58) Field of Classification Search
CPC .. H02B 1/056; H02B 1/18; H02J 1/001; H02J 1/086; H04W 88/08; H04W 88/085
See application file for complete search history.

(56) References Cited

U.S. PATENT DOCUMENTS

| 7,400,062 B2 * | 7/2008 | Pincu | G06F 1/3203 307/29 |
| 2015/0168974 A1 * | 6/2015 | Mascarenhas | H04L 12/10 700/297 |

(Continued)

OTHER PUBLICATIONS

International Search Report and Written Opinion, dated Nov. 7, 2022, received in connection with corresponding International Patent Application No. PCT/US2022/037308.

*Primary Examiner* — Timothy J Thompson
*Assistant Examiner* — Rhadames Alonzo Miller
(74) *Attorney, Agent, or Firm* — Meunier Carlin & Curfman LLC

(57) ABSTRACT

Disclosed is a power distribution system for powering a plurality of remote radio heads mounted on the top of a cell tower. The distribution system includes a plurality of bulk power inputs, each of which is coupled to a row of power input sockets, and a plurality of breaker input socket rows. The power input socket rows and breaker input socket rows are arranged such that they are evenly spaced and the sockets are in columns. The system includes a plurality of jumpers that are designed to be installed such that multiple combinations of connections between bulk power inputs and circuit breaker inputs such that the system can be easily reconfigured.

6 Claims, 3 Drawing Sheets

(51) Int. Cl.
*H02B 1/18* (2006.01)
*H02J 1/00* (2006.01)
*H04W 88/08* (2009.01)

(56) References Cited

U.S. PATENT DOCUMENTS

2018/0076603 A1\* 3/2018 Harwath ................. H01B 7/361
2020/0213940 A1\* 7/2020 Gandhi .................. G01R 31/40
2020/0351574 A1\* 11/2020 Hanley .................... H04Q 1/28

\* cited by examiner

CONFIGURABLE POWER DISTRIBUTION SYSTEM FOR REMOTE RADIO UNITS

CROSS REFERENCE TO RELATED APPLICATIONS

This is a U.S. National Stage application filed under 35 U.S.C. § 371 of PCT/US2022/037308, filed on Jul. 15, 2022, which application claims the priority benefit of and is a non-provisional of U.S. Provisional Application Ser. No. 63/222,162, filed Jul. 15, 2021, which application is hereby incorporated by this reference in its entirety for all purposes as if fully set forth herein.

BACKGROUND OF THE INVENTION

Field of the Invention

The present invention relates to wireless communications, and more particularly, to systems for powering remote radio units deployed on cell towers.

Related Art

The advent of modern cellular communications has led to the deployment of thousands of cell towers, each hosting multiple macro cellular antennas. Recent advances in cellular technologies has led to deploying remote radio units, which feed RF signals to the antennas, being deployed such that they are collocated with the antennas at the tops of the cell towers. Although this provides an effective solution for distribution of signals for transmission from the towers, it has a downside. First, power must be provided to the remote radio units from equipment racks located at or near the base of the tower; and second, given that multiple remote radio units may be deployed at the top of the cell tower, it is difficult and labor intensive to reconfigure the remote radio units, or to provide required power for additional remote radio units that may be added to address increasing demand for connectivity.

Conventional solutions for powering remote radio units involve static configurations in which a DC power source ("DC plant") is coupled to the circuit breakers at the input to the remote radio unit power lines. This greatly inhibits the ability to reconfigure the power distribution for the remote radio units in the case that additional remote radio units are added or upgraded, or if new DC power sources become available.

Accordingly, what is needed is a reconfigurable DC power distribution system that provides for flexibility and upgradability.

SUMMARY OF THE DISCLOSURE

Accordingly, the present disclosure is directed to a Configurable Power Distribution System for Remote Radio Units that obviates one or more of the problems due to limitations and disadvantages of the related art.

An aspect of the present disclosure involves a power distribution system for powering a plurality of remote radio units in a wireless telecommunications system. The system comprises a plurality of bulk power inputs; a plurality of power input socket rows, each of the plurality of power input socket rows coupled to a corresponding bulk power input, each of the plurality of power input socket rows having a plurality of power input sockets arranged along an x-axis and coupled together by a bus bar, wherein the plurality of power input socket rows are arranged whereby the plurality of input sockets are arranged in columns along the x-axis, and whereby the plurality of power input socket rows is divided into a first subset of power input socket rows having a first number of rows and a second subset of power input socket rows having a second number or rows; a plurality of breaker input socket rows having a third number of rows, each of the plurality of breaker input socket rows having a plurality of breaker input sockets arranged along the x-axis whereby they are aligned along the x-axis with a corresponding power input socket within each of the plurality of power input socket rows, wherein each of the plurality of breaker input sockets in a given column are coupled together and coupled to a corresponding circuit breaker input; a plurality of circuit breakers, each of the plurality of circuit breakers coupled to a corresponding circuit breaker input, and each of the plurality having a circuit breaker output, wherein each circuit breaker output is configured to be coupled to a corresponding remote radio unit via a conductor cable; and a plurality of jumpers configured to couple a source power input socket within the plurality of power input socket rows to a corresponding breaker input socket, each of the plurality of jumpers having a jumper length, wherein the plurality of breaker input socket rows are disposed between the first subset of power socket input rows and the second power input socket rows, and wherein the first number of rows and the second number of rows are not greater than the third number of rows, wherein the plurality of power input socket rows and breaker input socket rows are spaced along a y-axis by a row spacing, and wherein the jumper length corresponds to the row spacing multiplied by the third number of rows.

Another aspect of the present disclosure involves a method for configuring a power distribution system for a plurality of remote radio units. The method comprises determining a required power for each of a plurality of remote radio units; determining an available power from each of a plurality of bulk power inputs; identifying a power allocation between the plurality of bulk power inputs and the plurality of remote radio units; and installing a plurality of jumpers between a plurality of power input socket rows and a plurality of breaker input socket rows, wherein each of the plurality of power input socket rows is coupled to a corresponding bulk power input, wherein each of the plurality of jumpers couples one of the plurality of bulk power inputs to one of the plurality of remote radio units according to the power allocation.

Additional advantages of the Configurable Power Distribution System for Remote Radio Units will be set forth in part in the description which follows, and in part will be obvious from the description, or may be learned by practice of the Configurable Power Distribution System for Remote Radio Units. The advantages of the Configurable Power Distribution System for Remote Radio Units will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the Configurable Power Distribution System for Remote Radio Units, as well as the structure and operation of the various embodiments of the Configurable Power Distribution System for Remote Radio Units, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate Configurable Power Distribution System for Remote Radio Units. Together with the description, the figures further serve to explain the principles of the Configurable Power Distribution System for Remote Radio Units described herein and thereby enable a person skilled in the pertinent art to make and use the Configurable Power Distribution System for Remote Radio Units.

DESCRIPTION OF EXEMPLARY EMBODIMENTS

Reference will now be made in detail to embodiments of the Configurable Power Distribution System for Remote Radio Units with reference to the accompanying figures The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

Figure 1:
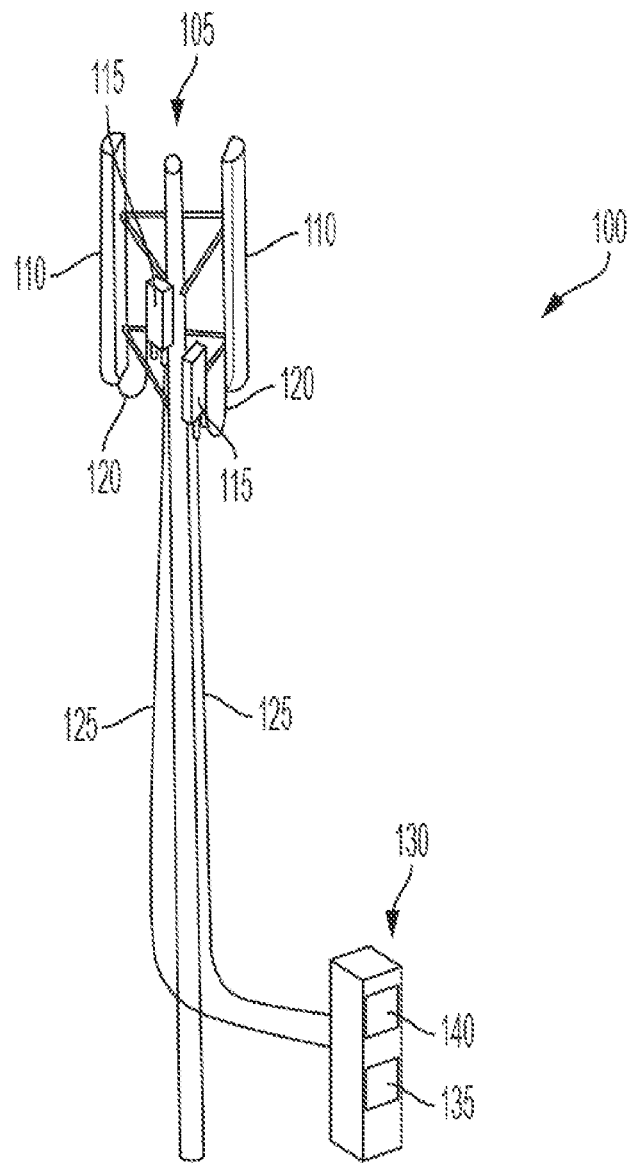
FIG. 1 illustrates a cell tower installation in which the power distribution system of the disclosure may be deployed.

FIG. 1 illustrates an exemplary cell tower installation 100 in which the power distribution system of the disclosure may be deployed. Cell tower installation 100 may include a cell tower 105, on which a plurality of macro antennas 110 may be mounted. Also mounted on cell tower 105 is a plurality of remote radio units 115, one per macro antenna 100. Each remote radio unit 115 may be coupled to its corresponding macro antenna 110 by a set of cables 120 that provide RF (radio frequency) signals, and control and power signals between macro antenna 110 and remote radio unit 115. Each remote radio unit 115 is coupled, via conductors 125, to an equipment rack 130 that may be located at the base of cell tower 105 or in its vicinity. The conductors 125 may carry signal data, control data, and power between the equipment rack 130 and each remote radio unit 115. Equipment rack 130 may have a base transceiver station 135, which may be an LTE eNodeB or 5G gNodeB, as well as a power unit 140.

Although FIG. 1 illustrates a cell tower deployment, it will be understood that the disclosed system may be deployed in different contexts, such as a rooftop system, an installation in a dense urban setting, a stadium, airport, or any other installation in which multiple remote radio units are provided power from an equipment rack. It will be understood that such variations are possible and within the scope of the disclosure.

Power unit 140 may have a plurality of power sources for powering the base transceiver station 135 and the remote radio units 115. The disclosed power distribution system may be part of, or work in conjunction with, power unit 140.

Figure 2:
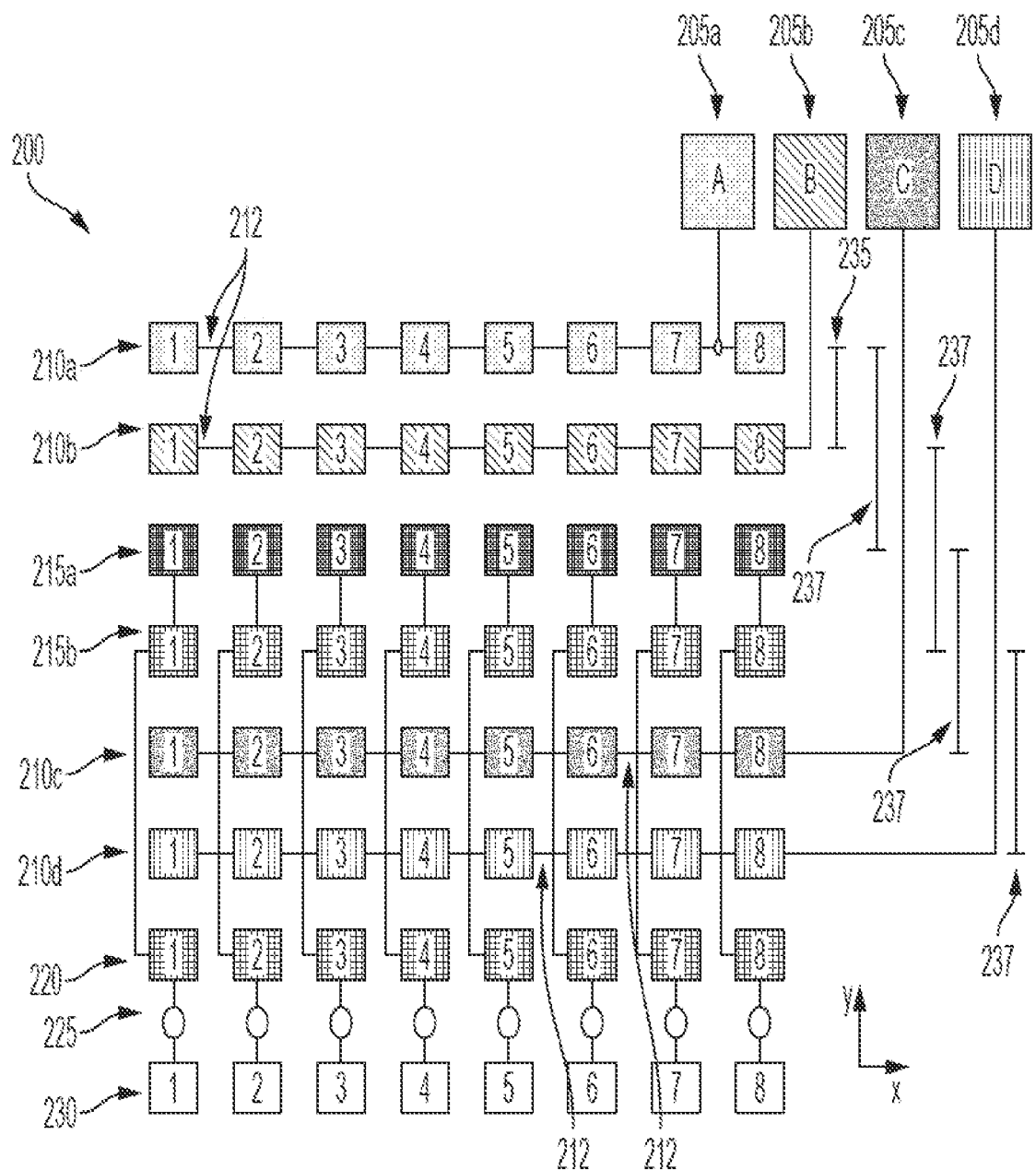
FIG. 2 illustrates an exemplary power distribution system with no jumpers installed.

FIG. 2 illustrates an exemplary power distribution system 200 of the disclosure. Power distribution system 200 has a plurality of bulk power input 205a, 205b, 205c, 205d. An example bulk power input 205a-d may have a nominal rating up to 80V, and up to 250 A. Each bulk power input 205a-d is respectively coupled to a plurality of power input socket rows 210a, 210b, 210c, 210d. Each set of sockets within each power input socket rows 210a-d are mutually coupled by a bus bar 212. Disposed between power input socket rows 210a, 210b and 210c, 210d are breaker input socket rows 215a and 215b.

As illustrated, power input socket rows 210a-d and breaker input socket rows 215a-b are arranged so that their constituent sockets are arranged in columns. In the illustrated example, there are eight columns, although more or fewer columns are possible and within the scope of the disclosure. Each column may correspond to a remote radio unit 115. Further to FIG. 2, power input socket rows 210a-d and breaker input socket rows 215a-b are uniformly spaced along the y-axis direction by a spacing 235.

Breaker input socket rows 215a and 215b are coupled by column such that breaker input socket 215a-1 is electrically coupled to breaker input socket 215b-1, input socket 215a-2 is coupled to breaker input socket 215b-2, etc. Each of the mutually coupled breaker input socket pairs 215a-1/215b-1, 215a-2/215b-2, 215a-3/215b-3 (etc.) are coupled to a corresponding circuit breaker input 220. Each of the circuit breaker inputs 220 are coupled to a corresponding circuit breaker output 230 by a corresponding circuit breaker 225. Further, each of the circuit breaker outputs 230 may be coupled to a corresponding remote radio unit 115 via a conductor cable 125.

Depending on the expected number of remote radio units 115 and their individual current draw, the cables, bus bars, and sockets may be dimensioned to handle maximum expected current load. For example, nominal 2/0AWG or 4/0AWG cables may be used to couple bulk power inputs 205a-d to their respective power input socket rows 210a-d, and the corresponding bus bars 212 may be designed with a cross sectional area similar to that of the nominal 2/0AWG or 4/0AWG cables. It will be understood that other cable gauges and dimensions may be employed, depending on the power requirements and number of remote radio units 115, and that such variations are within the scope of the disclosure. Further to this exemplary embodiment, each bus bar 212 may have a width of 0.6" and each may be spaced 0.6", resulting in a center-to-center spacing 235 of 1.2". For the actual sockets for power input socket rows 210a-d and breaker input socket rows 215a-b, conventional bullet connectors may be used. In an exemplary embodiment, each bullet connector may have, for example, a 0.325" outer diameter. Further, circuit breakers 225 may be of a conventional variety.

Figure 3:
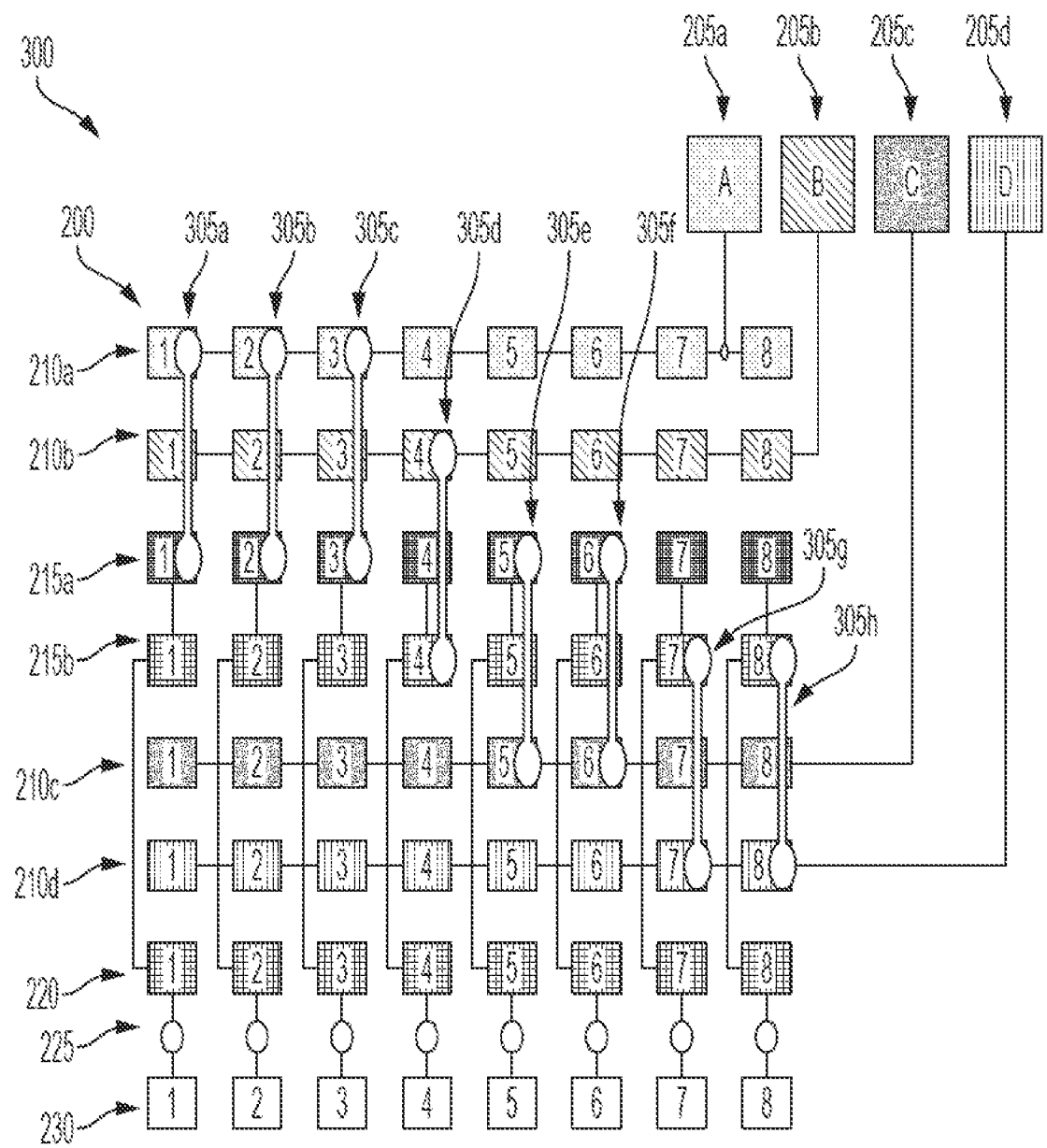
FIG. 3 illustrates the power distribution system of FIG. 2 with jumpers installed in a hypothetical example configuration.

FIG. 3 illustrates an example power distribution configuration 300 in which power distribution system 200 has a plurality of jumpers 305 that electrically couple different power input sockets 210 with designated breaker input sockets 215. In the illustrated example, bulk power input 205a is coupled to breaker input sockets 215a-1, 215a-2, 215a-3 by respective jumpers 305a-c. Specifically, jumper 305a electrically couples power input socket 210a-1 to breaker input socket 215a-1, which in turn couples bulk power input 205a to circuit breaker input 220-1; jumper 305b electrically couples power input socket 210a-2 to breaker input socket 215a-2, which in turn couples bulk power input 205a to circuit breaker input 220-2; and jumper 305c electrically couples power input socket 210a-3 to breaker input socket 215a-3, which in turn couples bulk power input 205a to circuit breaker input 220-3. Similarly, jumper 305d electrically couples power input socket 210b-4 to breaker input socket 215b-4, which in turn couples bulk power input 205b to circuit breaker input 220-4. Jumper 305e electrically couples power input socket 210c-5 to breaker input socket 215a-5, which in turn couples bulk power input 205c to circuit breaker input 220-5; and jumper 305f electrically couples power input socket 210c-6 to breaker input socket 215a-6, which in turn couples bulk power input 205c to circuit breaker input 220-6. Finally, jumper 305g electrically couples power input socket 210d-7 to breaker input socket 215b-7, which in turn couples bulk power input 205d to circuit breaker input 220-7; and jumper 305h electrically couples power input socket 210d-8 to breaker input socket 215b-8, which in turn couples bulk power input 205d to circuit breaker input 220-8.

The configuration 300 illustrated in FIG. 3 may be changed simply by rearranging the jumpers 305 so that different bulk power inputs 205a-d may have power distributed among circuit breaker inputs 220-1 through 220-8. This enables many different possible power distribution combinations without having to resort to rewiring. Further, if bulk power input 205a (for example) is replaced with a new bulk power input having greater capability, jumpers 305 may be rearranged so that new bulk power input 205a can serve a greater number of remote radio units 115.

Further, in the example illustrated in FIGS. 2 and 3, power distribution system 200 may be configured to provide power to up to eight remote radio units 115. It will be understood that an alternate power distribution system 200 may have more or fewer than 8 power channels, and that such variations are within the scope of the disclosure.

In another variation, power distribution system 200 may have one or more of its bulk power inputs 205a-d removed. In this case, jumpers 305 may be rearranged so that the remaining one or more bulk power inputs 205a-d may provide power to the circuit breaker inputs 220, as long as the conductors coupling the remaining one or more bulk power inputs 205a-d and their corresponding bus bars 212 have sufficient capability to carry the additional current.

In still another variation, power distribution system 200 may have more than four bulk power inputs 205. In the case of the addition of a fifth bulk power input, the corresponding power distribution system may have a fifth power input socket row 210, which may be located above power input socket row 210a or below power input socket row 210d. This will require a third breaker input socket row 215 that will be adjacent to the two breaker input socket rows 215a-b. It will be understood that such variations are possible and within the scope of the disclosure. Further to this variation, the number of power input socket rows 210 may be up to twice the number of breaker input socket rows 215, provided that the breaker input socket rows 215 are adjacent along the y axis; the power input socket rows 210 are divided into two subsets, a first subset disposed above the breaker input socket rows 215 along the y axis, and the second subset disposed below the breaker input socket rows 215 along the y axis; and neither the first subset nor the second subset has a number of power input socket rows greater than the number of breaker input socket rows 215, and all the power input socket rows 210 and breaker input socket rows 215 are spaced evenly along the y axis. For example, a system might have four breaker input socket rows and seven power input socket rows: three in the first subset and four in the second subset, or vice versa.

As illustrated in FIGS. 2 and 3, power input socket rows 210a, 210b, 210c, 210d and breaker input socket rows 215a and 215b are uniformly spaced along the y axis by a distance 235. In an exemplary embodiment, as stated above, spacing 235 may be 1.2". Each jumper 305a-h has a length that corresponds to the spacing 235 multiplied by the number of breaker input socket rows 215. For example, as illustrated in FIG. 3, there are two breaker input socket rows 215a,b and the length 237 of each jumper corresponds to twice the spacing 235, or 2.4". If, according to a variation, there are three breaker input socket rows, then the length of each jumper would correspond to three times the spacing 235. Each jumper 305a-h may be identical, having male bullet connectors designed to mate with the bullet sockets of power input socket rows 210a, 210b, 210c, 210d and breaker input socket rows 215a and 215b. The jumpers 305 may preferably be rigid, having similar conductors to that of the bus bars 212, or may alternatively be formed of a flexible cable Power distribution system 200/300 may be configured to provide power between bulk power inputs 205a-d and a plurality of remote radio units 115 according to the disclosure. Further, this process may be used to reconfigure power distribution system 200/300 to accommodate new or additional bulk power inputs 205 and/or remote radio units 115. For example, the process may be employed where a bulk power input 205 is being replaced with one with greater power capability; where a remote radio unit 115 is being replaced with one that has greater power requirements; or where an individual bulk power input 205 goes down and the remaining bulk power units make up for the missing input.

First, an installer or system designer determines the power requirements for each of the remote radio units 115 and determines the available power output from each of the bulk power inputs 205. Given this information, the installer or system designer identifies a power allocation between the bulk power inputs 205 and the plurality of remote radio units 115. Then the installer inserts the jumpers 305 to couple the bulk power input socket of the bulk power input socket row 210 corresponding to the appropriate bulk power input 205a-d to the breaker input socket 215 corresponding to the designated remote radio unit 115. The installer does this to map the bulk power input 205 to the intended remote radio unit 115 according to the identified power allocation.

This process may be repeated to reconfigure the power distribution system 200/300. As mentioned above, the process may be employed where a bulk power input 205 is being replaced with one with greater power capability; where a remote radio unit 115 is being replaced with one that has greater power requirements; or where an individual bulk power input 205 goes down and the remaining bulk power units make up for the missing input. In any of these situations, the installer or system designer may identify a new power allocation and the installer may remove and re-install jumpers 305 to couple the bulk power inputs 205 to the remote radio units 115 (via breaker input sockets 220, circuit breakers 225, and circuit breaker outputs 230).

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A power distribution system for powering a plurality of remote radio units in a wireless telecommunications system, comprising:
   a plurality of bulk power inputs;
   a plurality of power input socket rows, each of the plurality of power input socket rows coupled to a corresponding bulk power input, each of the plurality of power input socket rows having a plurality of power input sockets arranged along an x-axis and coupled together by a bus bar, wherein the plurality of power input socket rows are arranged whereby the plurality of power input sockets are arranged in columns along the x-axis, and whereby the plurality of power input socket rows is divided into a first subset of power input socket rows having a first number of rows and a second subset of power input socket rows having a second number of rows;
   a plurality of breaker input socket rows having a third number of rows, each of the plurality of breaker input socket rows having a plurality of breaker input sockets arranged along the x-axis whereby they are aligned along the x-axis with a corresponding power input socket within each of the plurality of power input socket rows, wherein each of the plurality of breaker input sockets is a given column are coupled together and coupled to a corresponding circuit breaker input;
   a plurality of circuit breakers, each of the plurality of circuit breakers coupled to a corresponding circuit breaker input, and each of the plurality of circuit breakers having a circuit breaker output, wherein each circuit breaker output is configured to be coupled to a corresponding remote radio unit via a conductor cable; and
   a plurality of jumpers configured to couple a source power input socket within the plurality of power input socket rows to a corresponding breaker input socket, each of the plurality of jumpers having a jumper length,
   wherein the plurality of breaker input socket rows are disposed between the first subset of power input socket rows and the second subset of power input socket rows, and wherein the first number of rows and the second number of rows are not greater than the third number of rows, wherein the plurality of power input socket rows and breaker input socket rows are spaced along a y-axis by a row spacing, and wherein the jumper length corresponds to the row spacing multiplied by the third number of rows.

2. The system of claim 1, wherein the third number of rows equals two.

3. The system of claim 1, wherein the third number of rows equals three.

4. The system of claim 1, wherein each of the plurality of power input socket rows comprises eight power input sockets.

5. The system of claim 1, wherein the row spacing is 1.2".

6. A method for configuring a power distribution system for a plurality of remote radio units, the method comprising:
   determining a required power for each of a plurality of remote radio units;
   determining an available power from each of a plurality of bulk power inputs;
   identifying a power allocation between the plurality of bulk power inputs and the plurality of remote radio units; and
   installing a plurality of jumpers between a plurality of power input socket rows and a plurality of breaker input socket rows, wherein each of the plurality of power input socket rows is coupled to a corresponding bulk power input,
   wherein each of the plurality of jumpers couples one of the plurality of bulk power inputs to one of the plurality of remote radio units according to the power allocation.

* * * * *